(No Model.)

J. McKIBBIN.
NECK YOKE COUPLING.

No. 290,257. Patented Dec. 18, 1883.

Attest:
Chas. H. Potter
A. M. Long.

J. McKibbin
Inventor
By W. H. Severance
Atty.

UNITED STATES PATENT OFFICE.

JOHN McKIBBIN, OF LIMA, OHIO.

NECK-YOKE COUPLING.

SPECIFICATION forming part of Letters Patent No. 290,257, dated December 18, 1883.

Application filed May 26, 1883. (No model.)

*To all whom it may concern:*

Be it known that I, JOHN MCKIBBIN, a citizen of the United States, residing at Lima, in the county of Allen and State of Ohio, have invented certain new and useful Improvements in Neck-Yoke Couplings; and I do declare the following to be a full, clear, and exact description of the invention, such as will enable others skilled in the art to which it appertains to make and use the same, reference being had to the accompanying drawings, and to the letters and (numerals) figures of reference marked therein, which form part of this specification.

My invention relates to couplings, especially such as are suitable for neck-yokes, pole-vehicles, and for other similar purposes, and is of the nature of a ball-and-socket joint, in combination with other requisite parts for purposes intended.

The objects of my invention are, first, to provide a coupling for neck-yokes and poles for vehicles, and for other similar purposes, having a central bearing capable of necessary oscillatory movement; second, to supply a coupling for neck-yokes and other similar purposes, which, having universal oscillatory movement required, shall have parts so arranged and constructed as to avoid purchase and chafing and friction; and, third, to produce an automatically locking and unlocking coupling by simplest means, cheap, and not liable to derangement, susceptible of style and finish suited to purposes and work intended.

Figure 1:
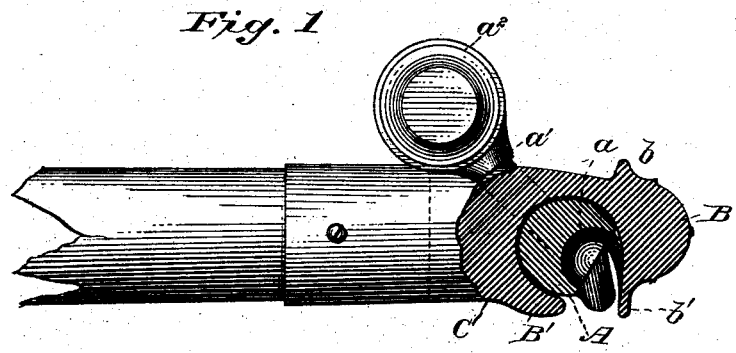
Figure 2:
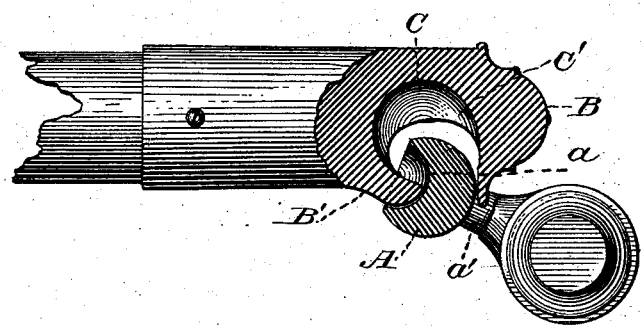
Figure 3:
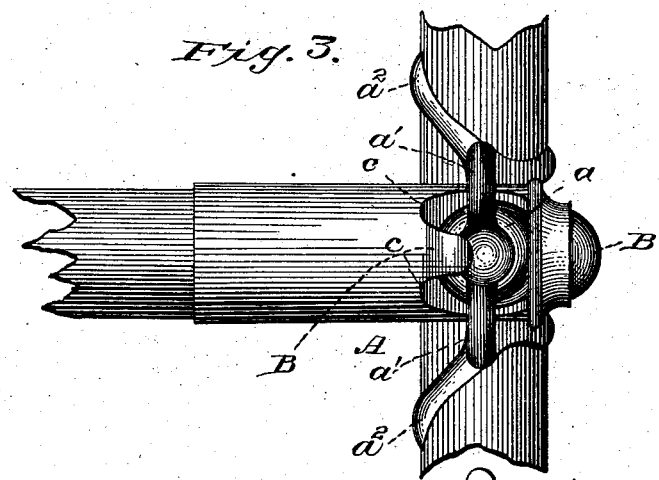

Figure 1 is an elevation, partly in section, of neck-yoke coupling, parts in operative position. Fig. 2 is also an elevation, partly in section, showing parts in relative position for engaging and disengaging; and Fig. 3 is an under side plan view, showing parts in locked position.

The same letters and numerals are employed to designate and identify parts referred to in drawings.

The body or ball A of the joint is provided with projecting arms $a'$, formed and attached to its sides, which, for neck-yoke purposes, are curved to swing clear of pole in action, and terminate at $a^2$ in yoke ferrule or clasp embracing the yoke. The socket C has the walls of cavity provided with U-shaped notches $c\ c$, so fashioned as to allow of insertion of ball A, and for free swinging of arms $a'$ over their edges. The lips B' and $b'$, projecting on the walls of socket C, may be, as in present case, formed therewith, or be attached thereon. The U-shaped notches $c\ c$ in edges of socket-walls are of extent in width and depth according to form of arms $a'$, and to provide for degree of oscillatory movement required of them. The inner surfaces of the lips B' and $b'$ in annular form and curve conform to those of inside surfaces of socket C, on the walls of which they project, and the body A shall be round or oblong to fit the shape of the socket snugly, to secure perfect joint and noiseless movement. The arms $a'$ and ball A, respectively, for purposes required, may be formed with or connected to other parts or irons by plates or lugs adapted therefor.

For neck-yoke couplings, the inner edges of the point of lip or tongue B' should be beveled or rounded up so that there shall be no corners thereon to obstruct the movement of the arms $a'$ in their action.

In arranging for the construction of my automatically locking and unlocking devices, the body A, in addition to arms $a'$, is provided with a recess or orifice in the side thereof, so shaped and of sufficient width and depth for tongue B' to be inserted therein (see Fig. 2, orifice $a$ over B') in the process of turning ball A into or out of socket C. Having this orifice in body A as deep as thickness thereof will allow, the tongue B' and lips $b'$ may have their edges approach quite closely over the ball in the socket, still allowing the ball to pass in the narrow space between, for the reason that the same space is occupied by tongue B' and body A to extent of insertion of the one into the other in the turning of the ball over the tongue into the socket. (See Fig. 3.) Thus, by simplest of devices, we have the securest of couplings by automatic action, in process of engaging and disengaging of parts.

Operation: When the parts are in operative position, as in Fig. 1, that side of body A in which is orifice $a$ is turned away from the end of tongue B', so that when coupling is in use the tongue cannot be inserted in the orifice. In this position or relation of parts the widest unbroken surfaces of ball and socket are in bearing together, and no other parts wearing. A strong smooth joint of great durability is secured, in which parts cannot become disengaged but by a reverse process carried out by intention, while the arrangement and construction hereinbefore described provide for all necessary oscillatory movement of parts, and for greatest convenience in coupling and uncoupling. To engage the parts in coupling, place the orifice $a$ over and insert tongue B' therein, (see Fig. 2,) then swing the parts into position, as in Figs. 1 and 3, wherein, as we have seen, the whole surfaces are in bearing, with orifice in ball away from the tongue, and ample space for swing of parts, free in universal movement, yet securely locked when in use. To disengage parts, simply turn them in the reverse direction, and orifice $a$ is brought over tongue B', which is again inserted therein. The movement continued, the body A is turned out of socket C. But, right here, if the weight of the pole is allowed to come onto the ball or body A, by automatic action the parts are held so that the carriage-pole, in case of neck-yoke couplings, cannot drop among the feet of the team, when the traces become unhitched, to frighten the horses, as is often the case with couplings in use. So this danger to life and property is avoided by use of my invention, which is quite as conveniently coupled and uncoupled.

Having thus fully described my invention, what I claim as new in couplings for neck-yokes, poles for vehicles, and for other similar purposes, and for which I desire to obtain Letters Patent, is—

1. In couplings for neck-yokes, vehicles, poles, and for similar purposes, in combination with required other parts, ball or body A, provided with arms $a'$, projecting on its sides, and terminations $a^2$, in yoke ferrule or clasp, as and for purposes substantially as described.

2. In couplings for neck-yokes, poles, and for other similar purposes, in combination with other usual plates or parts, socket C, provided with lips B' and $b'$ projecting on its walls, and the elliptical or U-shaped notches $c$ $c$ in opposite edges of socket-walls, as and for purposes substantially as set forth.

3. In couplings for vehicles, neck-yokes, poles, and other purposes, in combination with usual or requisite parts, round or oval body A, provided with orifice or recess $a$ in its side, in addition to axles or arms $a'$, constructed and arranged as and for purposes as specified and substantially as set forth.

In testimony whereof I affix my signature in presence of two witnesses.

JOHN McKIBBIN.

Witnesses:
A. G. STEWART,
J. R. HIGGINS.